Dec. 31, 1968 J. F. FLORY 3,419,238
PARALLEL PLATFORM LINKAGES FOR SHOCK ISOLATION SYSTEMS
Filed June 21, 1967

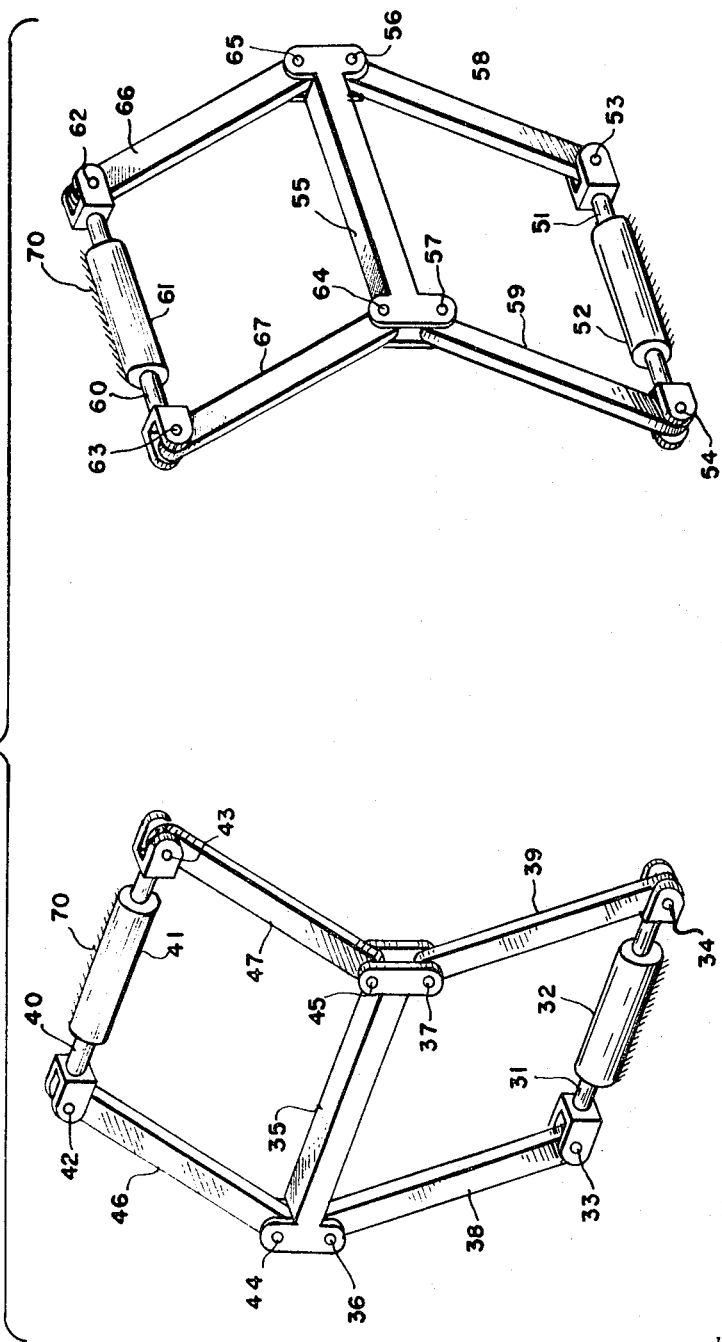

INVENTOR.
JOHN F. FLORY
BY *Harry A. Herbert Jr.*
ATTORNEYS

United States Patent Office 3,419,238
Patented Dec. 31, 1968

3,419,238
PARALLEL PLATFORM LINKAGES FOR SHOCK ISOLATION SYSTEMS
John F. Flory, Morristown, N.J., assignor to the United States of America as represented by the Secretary of the Air Force
Filed June 21, 1967, Ser. No. 648,536
9 Claims. (Cl. 248—163)

ABSTRACT OF THE DISCLOSURE

Constraint of rotational motion between a base and a movable platform is effected by a linkage system wherein a set of links of essentially equal length is connected at one end to the base and at the other end to a floating plate, and wherein a second set of links is attached at one end to said floating plate and at the other end to said movable platform, all connections being universal joints. In a variation of the system, two or more linkage units are comprised of parallelograms, one parallelogram having an element hinged to said base, the other having an element hinged to said platform, the two parallelograms having an element in common, and all elements having pivotal end connections.

---

The present invention relates to parallel platform linkages, and more particularly to parallel platform linkages as elements in shock isolation systems for protecting sensitive instruments from effects of nuclear-induced ground shock.

Shock sensitive items comprising a weapon or command system are usually grouped together on a platform which is connected by shock isolators to the walls or floor of a hardened structure. Thus, when subjected to a nuclear attack, the hardened structure may move violently, but the shock isolated platform and the equipment and personnel riding on it will experience only a mild oscillating motion.

Much effort has gone to developing methods of predicting and controlling the response of the shock isolated platform. Two response properties are of prime concern. First, the maximum absolute acceleration of the platform must be below a prescribed tolerance level. Second, the maximum relative displacement between the platform and the structure must be within a prescribed maximum known as rattlespace.

In analyzing the response of a shock isolated platform, it is usually assumed that the platform itself is rigid. The response of the shock isolated platform is then reduced to six modes or degrees-of-freedom. These six modes of response are the six coordinates of motion possible of a rigid body, three translational coordinates and three rotational coordinates. In determining the acceleration or displacement at any point on the platform, response in all modes must be accounted for.

Consider the displacement of a point P on a platform but not at the center-of-gravity. Three mutually perpendicular axes X, Y, and Z intersecting at the static center-of-gravity are defined. The dynamic displacements along these axes are $D_x$, $D_y$, and $D_z$, respectively. The dynamic rotations about these axes are $\alpha_x$, $\alpha_y$, and $\alpha_z$, respectively.

The vertical displacement of point P due to the vertical displacement of the center-of-gravity is simply $D_z$. The vertical displacement of point P due to rotation about axis X is $y \sin \alpha_x - z + z \cos \alpha_x$ and the vertical displacement of point P due to rotation about axis Y is $x \sin \alpha_y - z + z \cos \alpha_x$. There is no vertical displacement of point P due to motion in the other modes. The total vertical displacement of point P is then $P_z = D_z + x \sin \alpha_y + y \sin \alpha_y - 2z + z \cos \alpha_x + z \cos \alpha_y$.

It can be seen that the rotational terms can have a considerable effect on the total displacement of the point. In shock isolation systems the maximum displacement of extreme points on the platform is of vital concern and the rotational terms could take on extreme importance. A similar analysis would show that acceleration levels on the platform are also strongly dependent on rotational terms.

It would therefore be advantageous if a shock isolation system which prevented angular motion could be built. The nuclear ground shock environment has a very small amount of rotation. Therefore, the rotation input to the shock isolation system is small in comparison to the translational input. It should therefore be possible to eliminate or minimize rotation of the platform. Unfortunately, it is not feasible to design a shock isolated platform in which all modes of vibration are completely uncoupled. Such a design would require that the geometry of the shock isolation system meet strict specifications and that the shock isolation elements be absolutely linear. If these conditions are not fulfilled then the various modes will be coupled; that is, motion in one mode will excite motion in the other modes.

Present shock isolation systems are designed to minimize coupling between modes. The input disturbance is short in duration compared with the natural frequencies of the system. Damping is provided to reduce the number of free vibrations. Nevertheless, some rotational motion is induced, and it is very difficult to determine by analysis how much rotational motion will occur.

It is the object of the present invention to construct a shock isolation system which essentially eliminates rotational response. This system consists of a platform provided with conventional isolator elements and, in addition, with special parallel motion linkages. The linkages would be positioned between the platform and the base and would prevent relative rotation between the platform and the base but would allow relative translation.

A further object of the invention is the provision of a shock isolation system which when properly installed between sensitive material mounted on a platform and the surrounding structure, prevents rotation of the platform by kinematically restricting the platform to parallel motion, and wherein a countering movement preventing rotation is set up if any disturbance tends to rotate the platform.

In the drawing, FIGURE 1 is a perspective view of a parallel platform linkage arrangement according to the invention;

FIGURE 2 is a front elevational view of two linkage units showing alternate hinge and linkage details and illustrating an acceptable relative positioning of the two units;

FIGURES 3–9 inclusive are perspective views of a working model of the invention;

Figure 1:
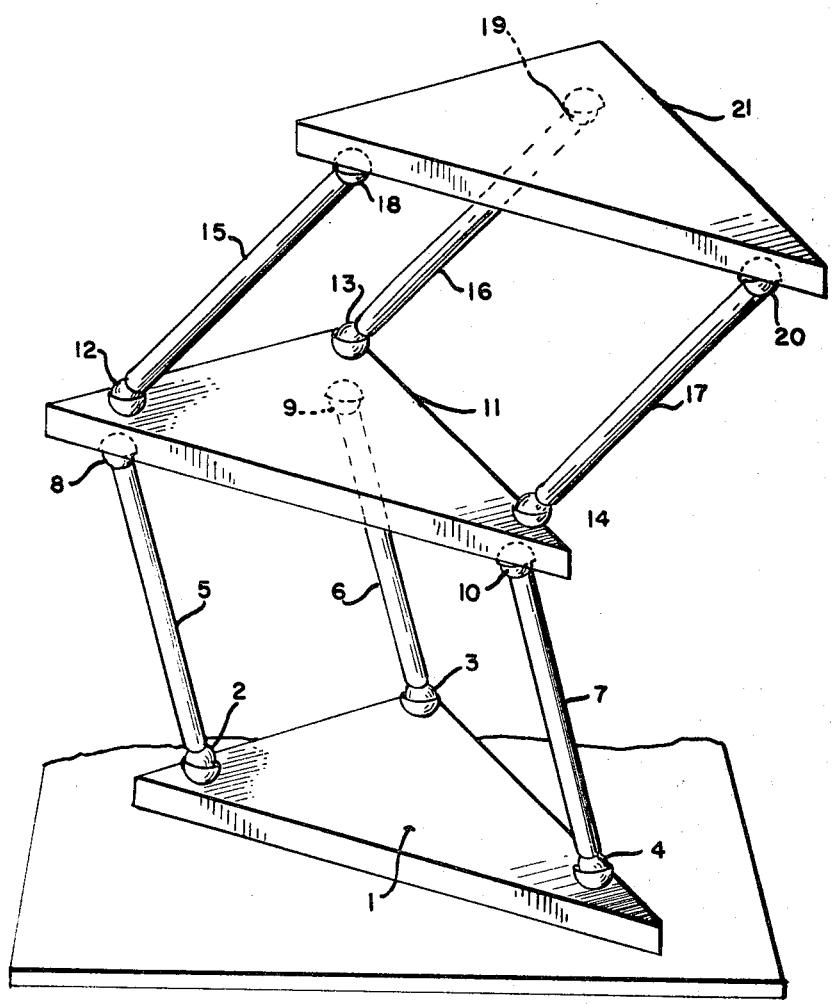
Figure 4:
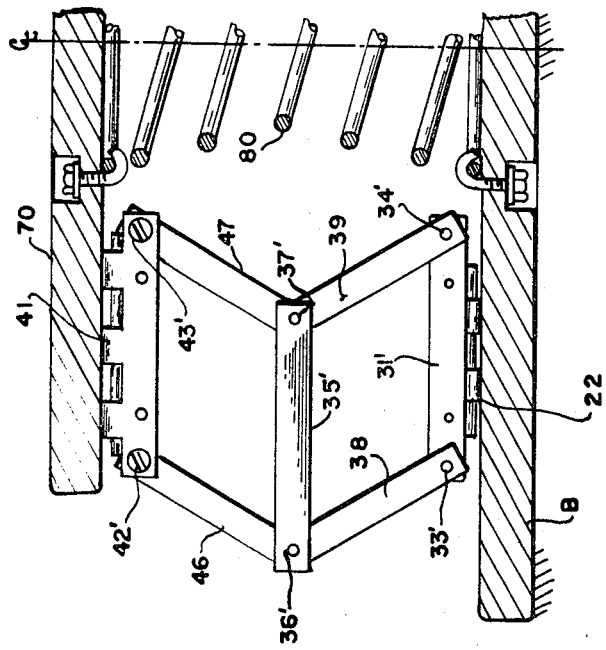
FIGURE 4 is a cross-sectional view taken on the line 4—4 of FIGURE 3 showing a parallel platform linkage and the shock isolation spring.
Figure 3:
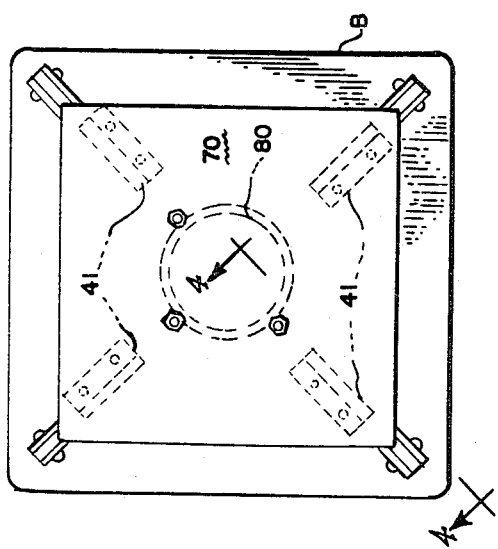
FIGURE 3 is a top plan view showing the preferred angle of installation of the four linkage units, i.e., at right angles to each other.
Figure 6:
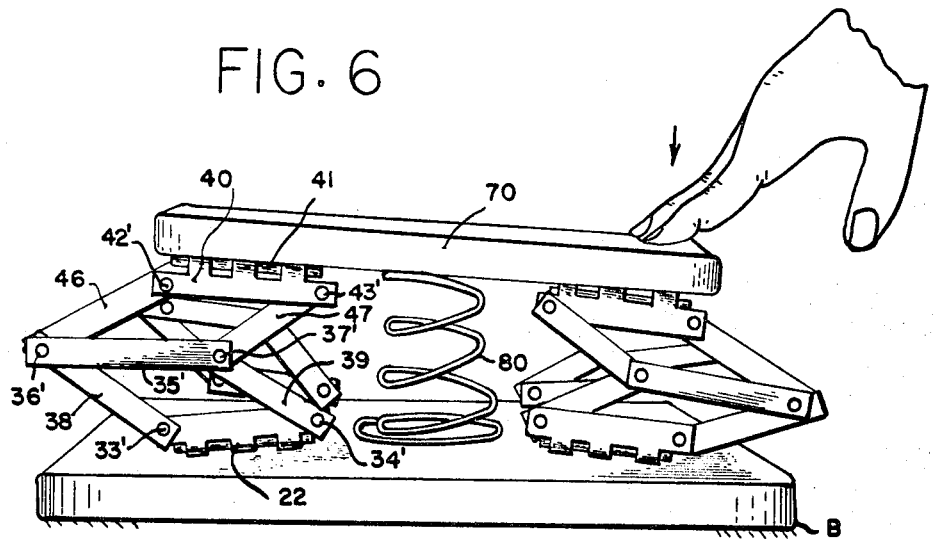
FIGURE 6 is a front view in perspective of the device showing the performance of the platform under force applied at the side center and from the top.
Figure 5:
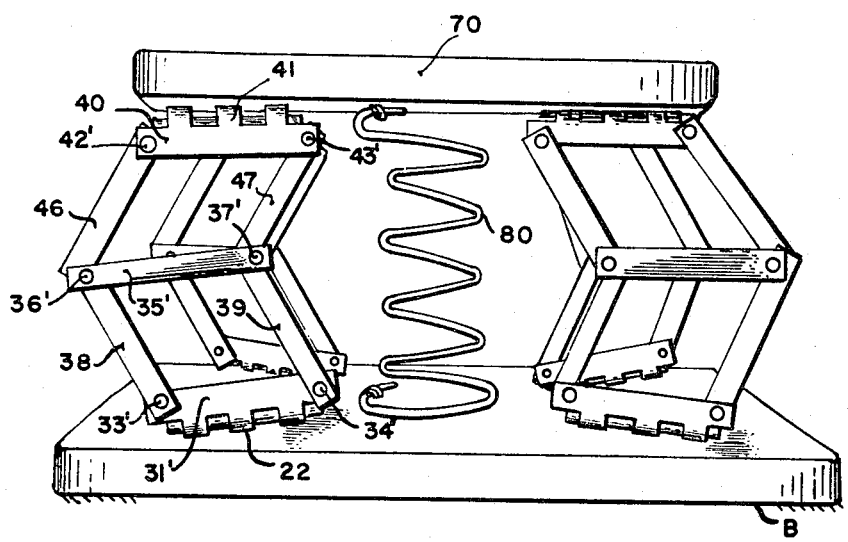
FIGURE 5 is a front perspective view showing the platform and base parallel and the links undistorted by shock or outside force.
Figure 7:
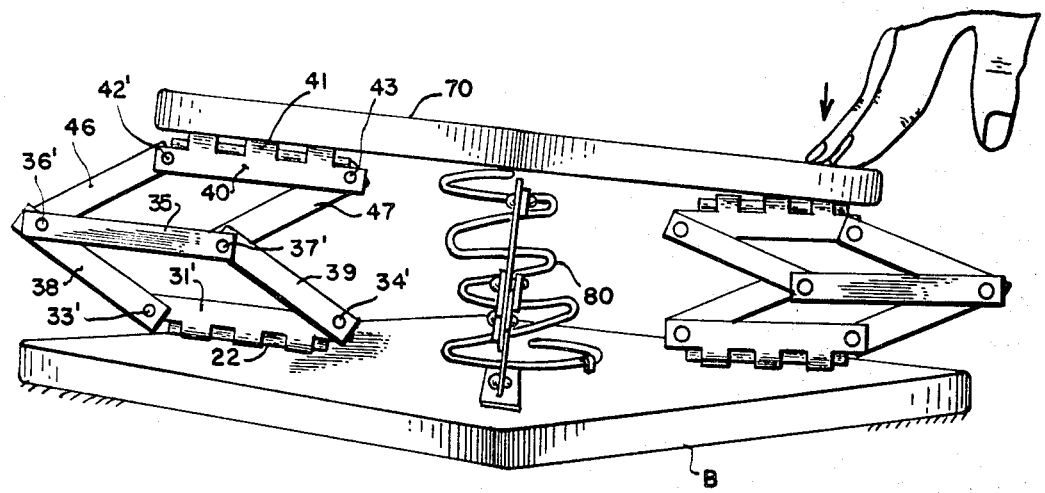
FIGURE 7 is a perspective view from a 45° angle showing the linkages distorted by force applied at a corner and from the top.
Figure 8:
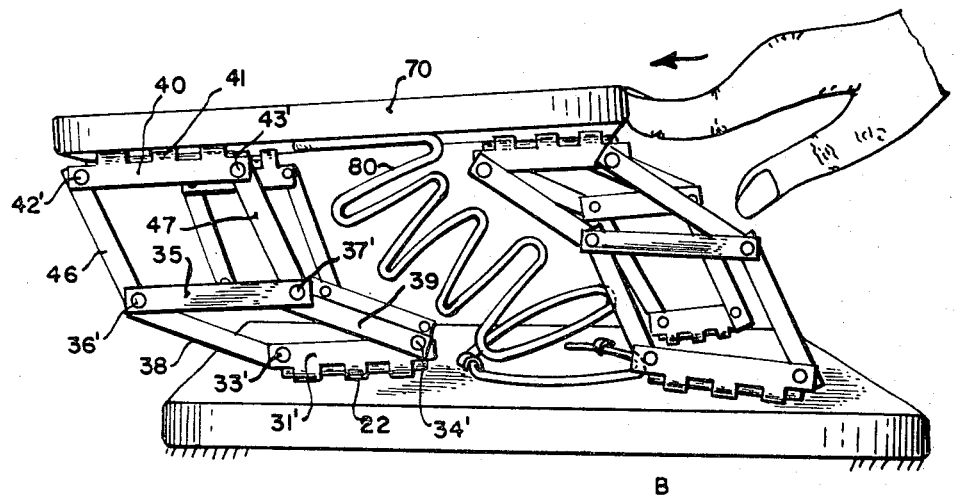
FIGURE 8 is a front perspective view showing distortion of the device under force applied from the side to the side center.
Figure 9:
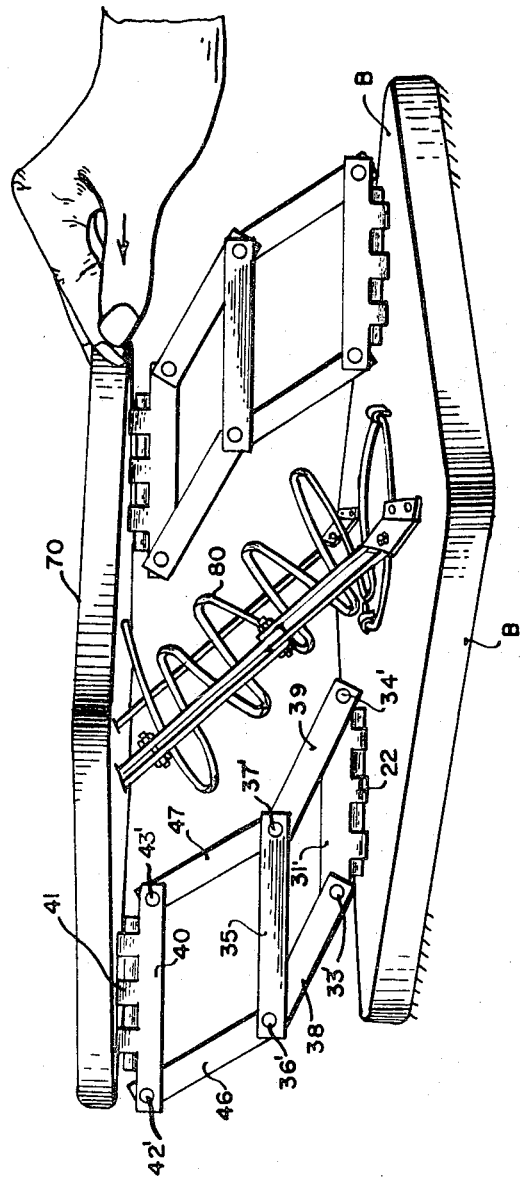
FIGURE 9 is a perspective view from approximately a 45° angle showing linkage distortion from a force applied at a corner and parallel to the platform.

Referring more in detail to the drawings, on FIGURE 1, which is one embodiment of the inventive concept, a base plate 1 is firmly attached to the ground or other protective structure.

At three unaligned points on the base plate 1, there are mounted universal hinges 2, 3 and 4, having freedom of rotation about two mutually perpendicular axes in the plane of the base plate 1. A floating plate 11 is provided above the base plate. On the bottom of the floating plate are mounted three universal hinges 8, 9 and 10 at points identical to the hinge points on the base plate, both plates viewed from above. Connecting the universal hinges on the base plate 1 with the corresponding universal hinges on the bottom of the floating plate 11 are three lower spacer links 5, 6 and 7, of equal length. What has been described is a floating element 11 which is constrained to move in arcs about the base plate 1 and to remain parallel to the base plate.

Mounted at three unaligned points on the top of the floating plate 11, are universal hinges 12, 13 and 14. A platform plate 21 is firmly attached to a platform which carries the sensitive material and is not shown in this figure. Attached to the bottom of the platform plate 21 are three universal hinges 18, 19 and 20, at points identical to the hinge points on the floating plate, both plates viewed from above. Three upper spacer links 15, 16 and 17, of equal length, connect the universal hinges on the platform plate 21 with the universal hinges on the top of the floating plate 11. The platform plate 21 is then constrained to move in arcs about the floating plate 11 and to remain parallel to it.

The floating plate 11 is constrained to movements parallel to the base plate 1 and the platform plate 21 is constrained to movements parallel to the floating plate 11. Therefore, the platform is constrained to movements parallel to the ground. Therefore, two rotational degrees-of-freedom are eliminated. If universal hinges which constrain rotation about the axis perpendicular to the base plate, such as the Hooke's joint, are employed, then the third rotational degree-of-freedom is eliminated. Alternately, if universal joints which do not constrain rotation about the axis perpendicular to the base plate, such as ball and socket joints, are employed, the third rotational degree-of-freedom may be eliminated by providing a second such device between the ground and the platform so that the base plate corresponding to plate 1 is not parallel to plate 1.

The floating plate is constrained to move in arcs about the base plate and the platform plate is constrained to move in arcs about the floating plate. However, no constraint is thereby placed on translational movements of the platform plate in relation to the base plate so long as the distance between the two plates does not exceed the maximum reach of the spacer links. Any point on the floating plate 11 will be confined to move along a circle formed by the intersection of two spheres with centers at corresponding points on the platform plate 21 and the base plate 1 and with radii equal to the lengths of the upper and lower spacer links, respectively. The circle so described is not necessarily in the plane of the floating plate 11. If the platform displaces upward, the circle grows smaller. If the platform displaces downward, the circle grows larger. If the platform is displaced to the side, the circle is displaced and changes size and the plane of the circle rotates. Translation of the platform plate is not, however, restricted unless the radius of the circle is equal to the length of the shortest spacer link or is zero.

Devices such as described above, when properly installed between a platform and its foundation, will then restrict the platform to motion in three translational degrees-of-freedom. To reduce the stresses in the universal hinges and in the spacer rods, it would be advisable to place many such devices around the platform. The device described is the preferred embodiment of a family of such devices, all capable of constraining the platform to parallel motion. What follows is a description of another such device which has been built and demonstrated to constrain rotational motion while allowing translational motion.

The device above described is simple in concept, and it satisfactorily accomplishes parallel motion restraint.

FIGURES 2–9 inclusive, show utilitarian and practical applications of the invention. FIGURE 2 shows an arrangement of two linkage units, and the function of the pairs of linkage units. The type of hinge used and the expedient details of the hinge elements are not essentially the essence of the invention.

Referring specifically to FIGURE 2 a base link 31 is fastened to the ground by a simple hinge 32 so that the link is free to rotate about its principal axis, but is constrained from rotation about its other two axes. Pivot pins 33 and 34, functioning as simple hinges are mounted on the base link with axes parallel to each other and perpendicular to the principal axis of the base link. The plane perpendicular to the axes of the hinges 33 and 34 and containing the principal axis of the base link 31 will be referred to as the linkage plane. The linkage plane is free to rotate around the axis of the hinge 32.

A floating link 35 is provided above the base link 31 with its principal axis in the linkage plane and parallel to the principal axis of the base link 31. Simple hinges 36 and 37 are mounted on the floating link 35 with axes perpendicular to the linkage plane. The distance between the axes of hinges 36 and 37 on the floating link 35 is equal to the distance between the axes of hinges 33 and 34 on the base link 31. The hinges are so arranged that a line between the axes of hinges 36 and 37 on the floating link is parallel to a line between the axes of hinges 33 and 34 on the base link 31. Spacer links 38 and 39 of equal length connect the hinges 36 and 37 on the floating link 35 with the corresponding hinges 33 and 34 on the base link 31.

Spacer links 38 and 39 are therefore constrained to rotate in the linkage plane. Further, the principal axis of the floating link 35 is constrained to translate in the linkage plane and to remain parallel to the principal axis of the base link 31.

A platform link 40 is fastened to the platform 70 by a simple hinge 41 so that the link is free to rotate about its principal axis, but is constrained from rotation about its other two axes. The principal axis of the platform link 40 is in the linkage plane and is parallel to the principal axes of the floating link 35 and the base link 31. Simple hinges 42 and 43 are mounted on the platform link 40 with axes perpendicular to the linkage plane. Simple hinges 44 and 45 are mounted on the floating link with axes perpendicular to the linkage plane. The distance between the axes of hinges 42 and 43 on the platform link 40 is equal to the distance between the axes of hinges 44 and 45 on the floating link. The hinges are so arranged that a line between the axes of hinges 42 and 43 on the platform link is parallel to a line between the axes of hinges 44 and 45 on the floating link. Spacer links 46 and 47 of equal length connect the hinges 42 and 43 on the platform link with the corresponding hinges 44 and 45 on the floating link.

Spacer links 46 and 47 are therefore constrained to rotate in the linkage plane. Further, the principal axis of the platform link 40 is constrained to translate in the linkage plane and to remain parallel to the principal axis of the floating link. The principal axis of the platform link is therefore constrained to remain parallel to the principal axis of the base link 31. The platform link is free, however, to translate without limitation in the linkage plane.

The platform, which is hinged to the principal axis of the platform link, is then free to translate in any direction in relation to the base without constraint. The platform is free to rotate about any axis parallel to the principal axis of the platform link. The platform is, however, constrained from rotation about any other axis. Two degrees of rotational freedom of the platform have been destroyed.

A second linkage, identical to the linkage described above, is connected between the ground and platform 70 and arranged so that the principal axis of the base link 51 is not parallel to the principal axis of base link 31. A second linkage plane is thus described. The principal axis of the platform link 60 of the second linkage is then not parallel to the principal axis of platform link 40. The floating link 55, the spacer links 58, 59, 66, 67, the hinge elements 53, 54, 56, 57, 62, 63, 64 and 65, the base link 52 and the platform line 60 of this second linkage, are identical to the corresponding elements of FIGURE 2.

The plaform 70 is still free to translate in any direction in relation to the base without constraint. The platform, however, is constrained from rotation about any axis not parallel to the principal axis of platform link 40 and also is constrained from rotation about any axis not parallel to the principal axis of platform link 60. Since the principal axes of the platform links are not parallel, there can be no axis which is parallel to both platform links and therefore the platform is constrained from rotation.

For maximum performance, it is desirable that the two linkages be positioned so that the principal axis of the base links are at right angles. To reduce the stresses in the various hinges and links, it is advisable to use a number of such linkages.

FIGURES 5–9 are perspective views of a working platform model demonstrating the functioning of the linkage units at rest and under forces representing shock from various angles.

The construction has been modified to the extent of simplifying the hinge construction. A simple bar element 31' is hinged to a base B by a simple hinge 22'. The spacer links 38 and 39 are secured to the base link 31' by pivot pins 33' and 34' which serve the function of simple hinges. Pivot pins 36' and 37' secure the floating link 35' to, respectively, spacer links 38 and 46 and the spacer links 46 and 47. The hinges 42' and 43' may be similarly modified. The design of the hinge is optional.

Four linkage units are shown in these views, all identical to the one described above and placed so that the base hinges extend at right angles to each other. A central spring 80 provides a restoring force.

The linkage need not be placed under the platform but could be placed on the side or on the top of the platform carrying the sensitive material.

Figure 10:
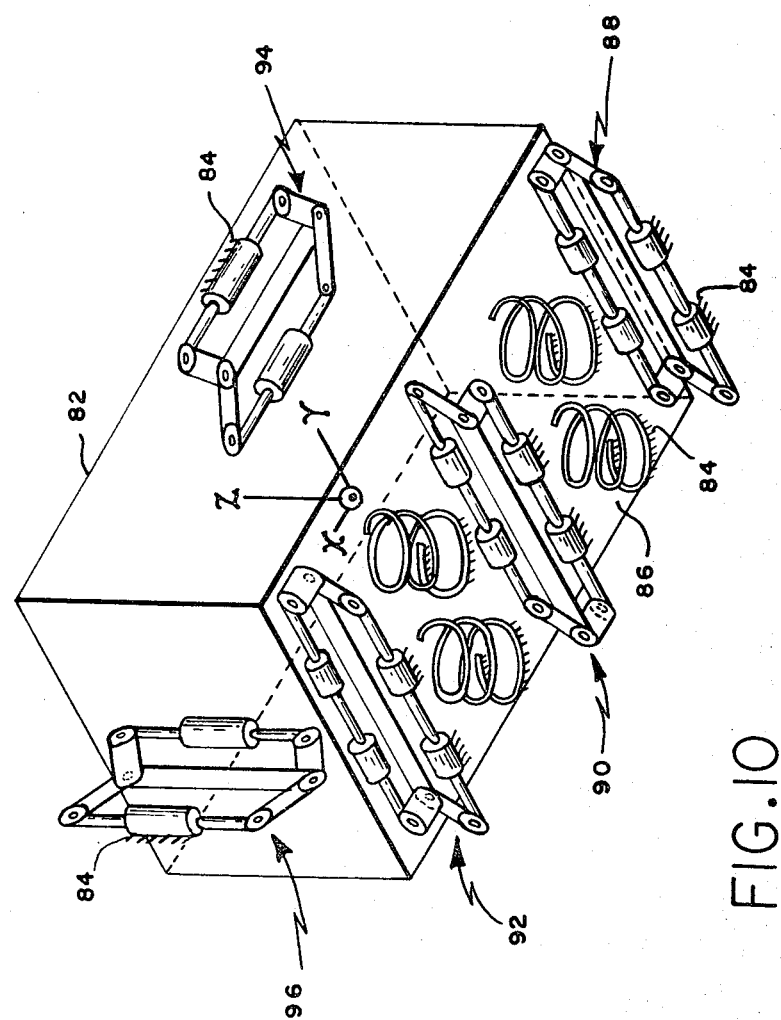
FIGURE 10 is a three-quarters perspective bottom view of a shock isolated structure showing the manner in which the invention might be installed.

FIGURE 10 shows a shock isolated structure viewed from a lower corner. The structure 82, is supported by shock isolating springs 86 within a cavity with walls and floor indicated at 84. Three linkage units 88, 90 and 92 each have one link hinged to the floor of the cavity and another link hinged to the bottom of the structure. These linkage units are parallel platform linkages. They effectively prevent rotation of the structure about its longitudinal axis X, and also serve to prevent rotation of the structure about its vertical axis Z. Another parallel platform linkage 94 is hinged to the side of the structure and to the wall of the cavity. This unit effectively prevents rotation of the structure about its vertical azis Z and also serves to prevent rotation of the structure about its transverse axis Y. Another parallel platform linkage 94 is hinged to the front of the structure and to the wall of the cavity. This unit effectively prevents rotation of the structure about its transverse axis Y and also serves to prevent rotation of the structure about its longitudinal axis X. Thus the structure is constrained against rotation about any axis. Since parallel platform linkages have been employed, the structure is free to move in translation, however.

The parallel platform linkages which have been described may be used to constain rotation between a platform and a base in systems other than shock isolation systems. The platform may be supported by means other than springs. Such support means might be magnetism, air jets or the buoyancy of a platform immersed in water. In the absence of gravity as in outer space no support means would be necessary.

Although the invention has been described with reference to particular embodiments, it will be understood to those skilled in the art that the invention is capable of a variety of alternative embodiments within the spirit and scope of the appended claims.

I claim:
1. A linkage device for constraining rotational motion between a base and a movable platform comprising a base plate, a floating plate and a platform plate, links each connected to said base plate at one end and to said floating plate at the other end, similar links each connected to said platform plate at one end and to said floating plate at the other, all connections of said links being universal in character.

2. A linkage device for constraining rotational motion between a base and a movable platform as claimed in claim 1 wherever the links interconnecting the base plate and the floating plate are of essentially equal lengths and the links interconnecting the platform plate and the floating plate are of essentially equal lengths.

3. A linkage device for constraining rotational motion between a base and a movable platform as claimed in claim 1 wherein the floating plate connections of the links interconnecting the base plate and the floating plate are similar in arrangement to the base plate connections and the floating plate connections of the links interconnecting the platform plate and the floating plate are similar in arrangement to the platform plate connections.

4. A linkage device for constraining rotational motion between a base and a shock isolated platform comprising a base plate, a floating plate and a platform plate, links of essentially equal length each connected to said base plate at one end and to said floating plate at the other end, the said connections to the floating plate being similar in arrangement to the said connections to the base plate, links of essentially equal length each connected to said platform plate at one end and to said floating plate at the other end, the said connections to the floating plate being similar in arrangement to the said connections to the platform plate, all said connections of said links being universal in character.

5. A linkage device for constraining rotational motion between a base and a movable platform comprising at least two linkage units interposed between the platform and the base, each of said linkage units comprised of elements of fixed length capable of relative pivotal movement, all elements of each of said units constrained to remain in the same plane during said pivotal movement.

6. A linkage device for constraining rotational motion between a base and a movable platform as claimed in claim 5 wherein each of said linkage units is comprised of individual links so pivoted as to form two parallelograms, said parallelograms having a floating element in common.

7. A linkage device for constraining rotational motion between a base and a movable platform as claimed in claim 6 wherein an element of one parallelogram has hinged connection with the base and an element of the other parallelogram has hinged connection with the platform, the said hinged connections being perpendicular to the plane in which linkage pivotal motion is constrained.

8. A linkage device for constraining rotational motion between a base and a movable platform as claimed in claim 7 wherein the said base hinged connection of one linkage unit has angular positioning with respect to the said base hinged connection of another linkage unit.

9. A linkage device for constraining rotational motion between a base and a shock isolated platform, said device comprising four linkage units interposed between the platform and the base, each of said linkage units comprised of elements capable of relative pivotal movement, all elements of each of said units constrained to remain in the same plane during said pivotal movement, the said elements of each of said units including individual links so pivoted as to form two parallelograms, said parallelograms having a floating element in common, in each linkage unit an element of one parallelogram having hinged connection with the base, and an element of the other parallelogram having hinged connection with the platform, the said hinged connections being perpendicular to the plane in which linkage pivotal motion is constrained, pairs of said units being diagonally opposed and lying in the same plane, each plane being positioned at right angles to the other.

References Cited

UNITED STATES PATENTS

| | | | |
|---|---|---|---|
| 3,159,968 | 12/1964 | Welles | 248—163 X |
| 3,229,941 | 1/1966 | Suliteanu et al. | 248—163 |
| 3,288,421 | 11/1966 | Peterson | 108—4 |
| 3,291,431 | 12/1966 | Daniel | 248—277 |

FOREIGN PATENTS 999,010  7/1965  Great Britain.

JAMES T. McCALL, *Primary Examiner.*

U.S. Cl. X.R.

108—136, 145; 248—20